United States Patent [19]

Murata

[11] Patent Number: 4,791,698
[45] Date of Patent: Dec. 20, 1988

[54] WIPER WITH WIPER ARM SWEEPING ANGLE CHANGER

[75] Inventor: Yukiho Murata, Kanagawa, Japan

[73] Assignee: Nissan Motor Company, Ltd., Yokohama, Japan

[21] Appl. No.: 95,073

[22] Filed: Sep. 11, 1987

[30] Foreign Application Priority Data

Sep. 24, 1986 [JP] Japan .................. 61-225495

[51] Int. Cl.[4] .................. B60S 1/08; B60S 1/24
[52] U.S. Cl. .................. 15/250.13; 15/250.16; 74/522; 74/571 M; 74/600; 74/50
[58] Field of Search .......... 15/250.13, 250.16, 250.17, 15/250.27, 250.34; 74/522, 571 M, 600, 836, 50, 75

[56] References Cited

U.S. PATENT DOCUMENTS

3,091,128  5/1963  De Rees et al. ............ 15/250.17 X
3,616,702  11/1971  Kolb ...................... 15/250.17 X

FOREIGN PATENT DOCUMENTS

2655078  6/1978  Fed. Rep. of Germany ... 15/250.13

*Primary Examiner*—Peter Feldman
*Attorney, Agent, or Firm*—Pennie & Edmonds

[57] ABSTRACT

Herein disclosed is a wiper which can selectively assume a "semi-concealed mode" and a "full-concealed mode". The wiper comprises an output gear housed in a case, an output shaft having one end to which a motor arm is secured, a wiper arm assembly including a connecting rod which is pivotally connected to the motor arm, a first mechanism for transmitting rotation of the output gear to the output shaft, a bushing rotatably housed in the case and having an eccentric bore through which the output shaft is rotatably passed, a second mechanism for locking the bushing to one of the case and the output gear while changing relative angular positioning between the bushing and the output gear, and a push button arranged on the case and actuating the second mechanism when manipulated.

12 Claims, 3 Drawing Sheets

WIPER WITH WIPER ARM SWEEPING ANGLE CHANGER

BACKGROUND OF THE INVENTION

1. Field of the Invention

The present invention relates in general to an automotive wiper for wiping a windshield or the like, and more particularly to an automotive wiper having a mechanism by which the sweeping angle of a wiper arm is changeable.

2. Description of the Prior Art

Hitherto, various types of wipers have been proposed and put into practical use particularly in the field of motor vehicles. Some of them are of a so-called "full-concealed type" in which a larger sweeping angle of the wiper arm is obtained and some are of a so-called "semi-concealed type" in which the sweeping angle of the wiper arm is somewhat reduced. Furthermore, some modernized motor vehicles are equipped with a wiper of combination type in which the wiper arm can selectively take the full-concealed and semi-concealed modes as occassion calls. The combination type is equipped to motor vehicles which are particularly used in a snowy country. In fact, in winter when the wiper is compelled to sweep away snow on the windshield, the semi-concealed mode is selected in order to lighten the load applied to the wiper arm. That is, in winter, the wiper arm pocket for fully concealing the wiper arm tends to collect snow. Thus, if the wiper is started with the wiper arm being in the full-concealed mode, excessive load is suddenly applied to the wiper arm for removing the snow in the pocket. This may cause malfunnction of the wiper.

However, in the conventional wipers of the above-mentioned combination type, the switching from the "full-concealed mode" to the "semi-concealed mode" and vice versa can not be simply carried out because of their inherency in construction. In fact, some of them require troublesome disassembling and reassembling work for the parts when the switching is needed.

SUMMARY OF THE INVENTION

It is therefor an object of the present invention to provide a wiper of the above-mentioned combination type, which is characterized by a simplicity with which the switching between the full-concealed mode and the semi-concealed mode is achieved.

According to the present invention, there is provided a wiper which comprises a case; an output gear housed in the case and rotatable about its axis; an output shaft extending perpendicular to the output gear and having one end to which a motor arm is secured; a wiper arm assembly including a connecting rod which has one end pivotally connected to a free end of the motor arm; first means for transmitting rotation of the output gear to the output shaft; a bushing having an eccentric bore through which the output shaft is rotatably received, the bushing being rotatably received in the case; second means for locking the bushing to one of the case and the output gear while changing relative angular positioning between the bushing and the output gear; and a push button arranged on the case and actuating the second means when manipulated.

DETAILED DESCRIPTION OF THE INVENTION

Figure 1:
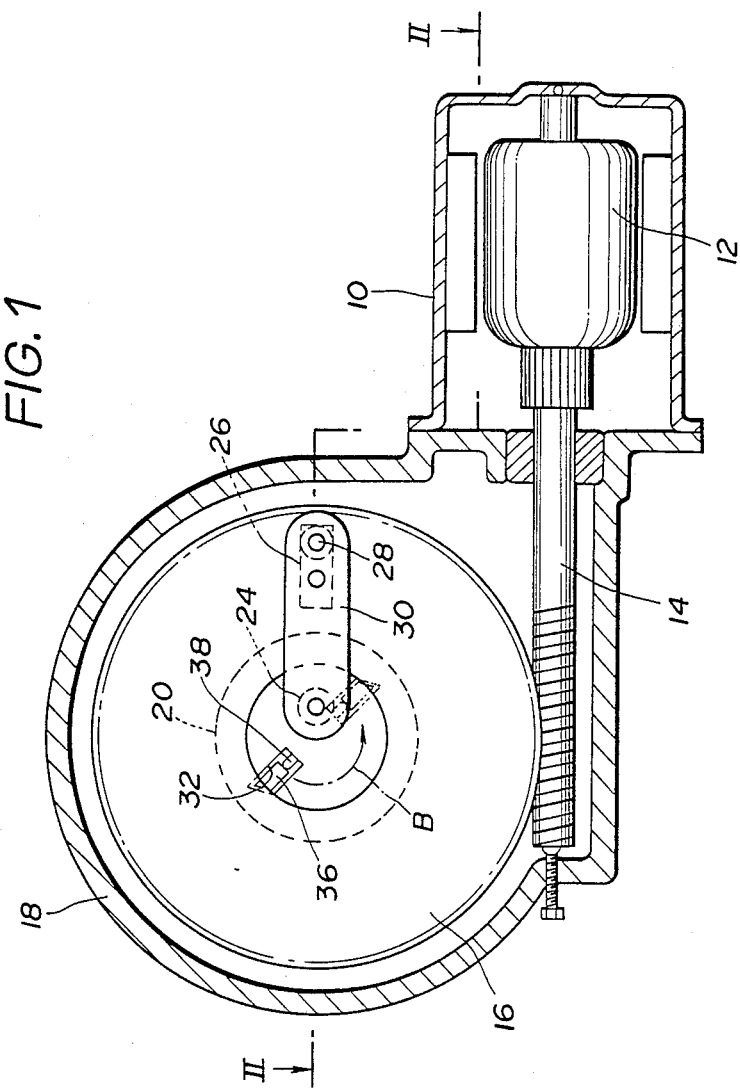
FIG. 1 is a sectional view of a wiper of the combination type according to the present invention.
Figure 2:
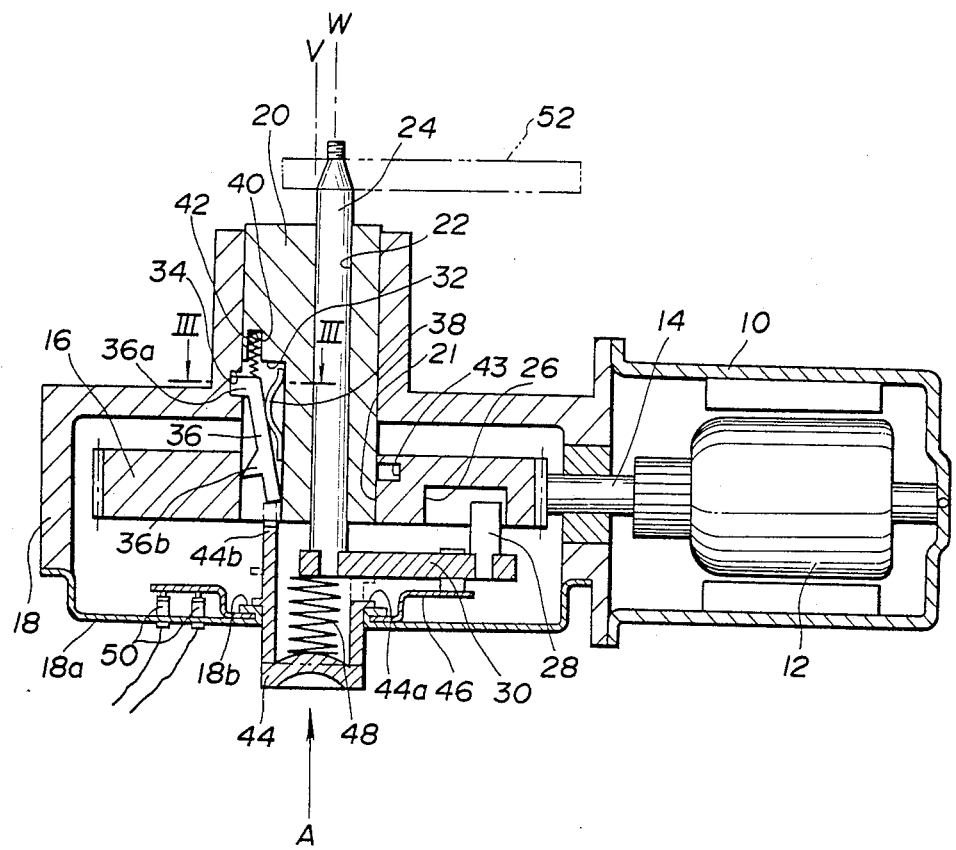
FIG. 2 is a sectional view taken along the line II—II of FIG. 1.

Referring to FIGS. 1 and 2, there is shown a wiper of the present invention. In the drawings, denoted by numeral 10 is a motor case in which a wiper motor 12 is installed. The wiper motor 12 has a worm shaft 14 projected therefrom. The worm shaft 14 is projected into a gear case 18 and operatively meshed with an output gear 16 which is rotatably received in the gear case 18. Thus, upon energization of the motor 12, the worm shaft 14 is rotated and thus the output gear 16 is rotated. As is seen from FIG. 2, the output gear 16 is rotatably disposed about a bushing 20 which is, in turn, housed in the gear case 18. Denoted by numeral 21 is the center bore of the output gear 16 for rotatably receiving the bushing 20. The bushing 20 has an eccentric bore 22 formed therethrough, and an output shaft 24 is rotatably received in the eccentric bore 22 with its upper and lower ends projected outwardly from he bore 22. The bore 22 is offset from the center axis of the bushing 20. The output gear 18 is formed at its lower side, as viewed in FIG. 2, with a radially extending elongate recess 26 into which a pin 28 is projected. As will become apparent as the description proceeds, the pin 28 is slideable in and along the recess 26. The pin 28 is carried by an arm 30 which is fixed at its base portion to the projected lower end of the output shaft 24. Thus, rotation of the output gear 16 is transmitted through the pin 28 and the ar 30 to the output shaft 24.

As is best seen from FIG. 2, the bushing 20 is formed at its cylindrical outer side with an axially extending groove 32 which is merged with a part of the center bore 21 o the output gear 16. The gear case 18 is formed at its cylindrical inner side adjacent the groove 32 with a cut 34. A stopper 36 in the form of rod extends between the groove 32 and the cut 34. That is, the stopper 3 is formed with spaced first and second projections 36a and 36b which are formed on the same side. A curved leaf spring 38 is interposed between a bottom of the groove 32 of the bushing 20 and a back side of the stopper 36 thereby to bias the stopper 36 radially outwardly having the first projection 36a engaged with the cut 34. As is seen from FIG. 2, the second projection 36b is pressed against the inner wall of the center bore 21. The inner wall of the center bore 21 is formed with a cut 43 which, in a given state, receives the second projection 36b of the stopper 36. The groove 32 of the bushing 20 has, at its upper side as viewed in FIG. 2, an extension 40 in which a spring 42 is received. One end of the spring 42 abuts on the stopper 36 to bias the same downward in the drawing.

As is seen from FIG. 2, at a lower side of the gear case 18, there is arranged a push button 44 which is cylindrical in shape and movable in parallel with the axis of the output shaft 24 and rotatable about the axis of the output shaft 24 and rotatable about the axis. The push button 44 is slidably received in a circular opening (no numeral) formed in a case cover 18a of the gear case 18. The peripheral edge of the circular opening of the case cover 18a is folded back to rotatably support a contact plate 46 which will be described hereinafter. The folded back portion is denoted by numeral 18b. The push button 44 is formed with a flange 44a which abuts on the folded back portion 18b of the circular opening of the case cover 18a to prevent disconnection of the button 44 from the case cover 18a. The push button 44 has an upper end portion 44b which extends t a position near a lower end of the stopper 36. Denoted by numeral 48 is a spring which is compressed between the base portion of the arm 30 and a bottom wall of the button 44, so that the button 44 is baised outwardly, viz., in a downward direction in FIG. 2, from the gear case 18. It is to be noted that engagement of the flange 44a of the button 44 with the folded back portion 18b of the case cover 18a prevents the push button 44 from getting off the gear case 18. The rotatable contact plate 46 has two conductive plates (no numerals) attached to the lower surface thereof through insulating means. Stationary contacts 50 and 50 are fixed to the case cover 18a and incorporated with the conductive plates on the plate 46 to constitute a known auto-parking mechanism of the wiper.

Figure 4:
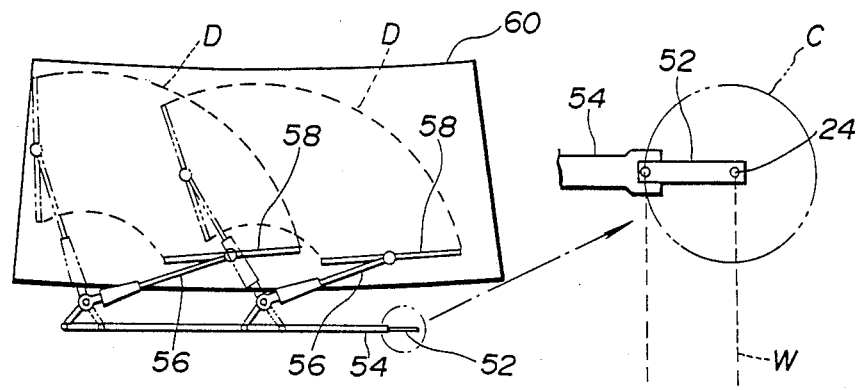
FIG. 4(A) is a drawing showing wiper arms in a semi-concealed mode.
FIG. 4(B) is a drawing showing the wiper arms in a transition from the semi-concealed mode to a full-concealed mode or vice versa.
FIG. 4(C) is a drawing showing the wiper arms in the full-concealed mode.
Figure 4:
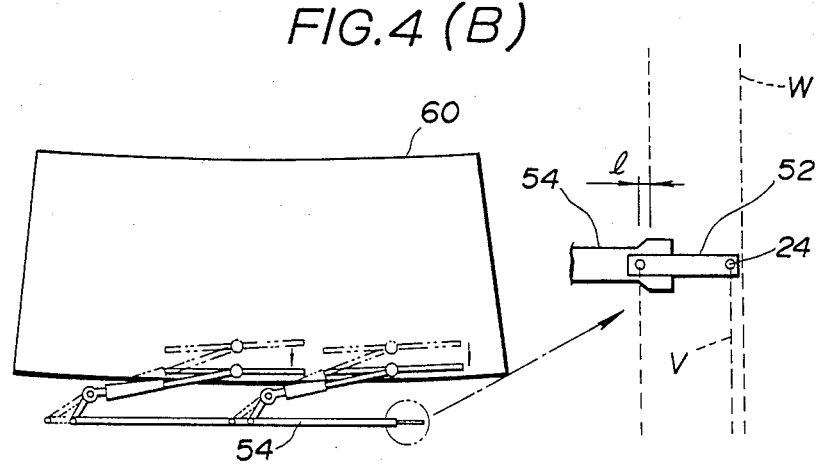
Figure 4:
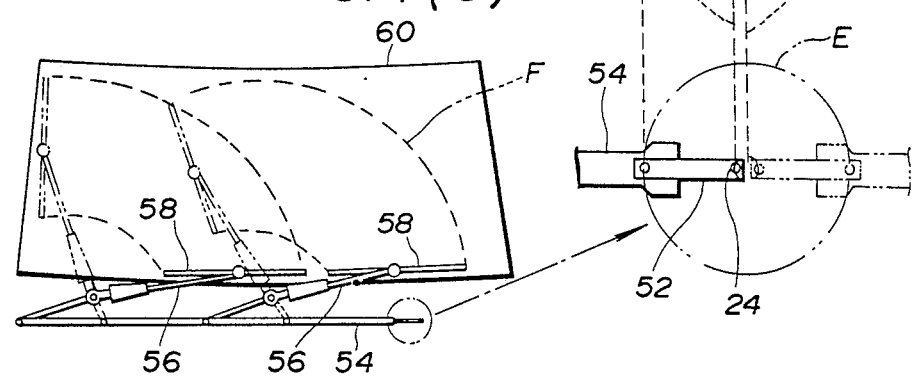

As is seen from FIG. 2, fixed to the projected upper end of the output shaft 24 is a motor arm 52 which, as will be seen from FIG. 4(A), is connected to a connecting rod 54 to which wiper arms 56 and 56 are pivotally connected. Wiper blades 58 and 58 are carried by the wiper arms 56 and 56 in a known manner. As will become apparent hereinafter, the connecting rod 54 is reciprocatively moved to make the wiper arms 56 and 56 move pivotally.

Figure 3:
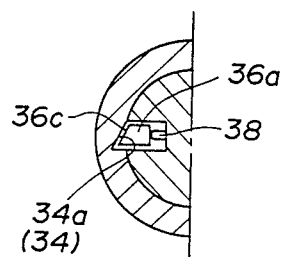
FIG. 3 is a sectional view taken along the line III-—III of FIG. 2.

As is seen from FIG. 3, the first projection 36a of the stopper 36 is formed with an inclined surface 36c, and the cut 34 of the gear case 18 is also formed with an inclined surface 34a which is engageable with the inclined surface 36c of the stopper 36. With these inclined surfaces, getting in and getting out motions of the first projection 36a relative to the cut 34 is facilitated.

In the following, operation of the wiper of the invention will be described with reference to the drawings.

For ease of understanding, the description will be commenced with respect to the condition shown in FIGS. 1 and 2. In this condition, the first projection 36a of the stopper 36 is engaged with the cut 34 of the gear case 18, so that the bushing 20 is latched to the gear case 18 and thus the bushing 20 is prevented from rotation about its axis.

Thus, under this condition, rotation of the worm shaft 14 due to energization of the wiper motor 12 is transmitted through the output gear 16, the pin 28 and the arm 30 to the output shaft 24, so that the motor arm 52 is rotated about the axis "W" of the output shaft 24. This condition is depicted by FIG. 4(A). That is, under this condition, the motor arm 52 is rotated about the axis of the output shaft 24 with its leading end describing a circular path "C". Due to the pivotal connection between the motor arm 52 and the connecting rod 54, the rotation of the motor arm 52 brings about reciprocating movement of the connecting rod 54 thereby making the wiper blades 58 and 58 describe the sweeping patterns "D" on a windshield 60. In this case, the "semi-concealed mode" is carried out.

Upon requirement of mode change of the wiper, the following steps are taken. First, the push button 44 is pushed, against the force of the spring 48, into the gear case 18, that is, in the direction of the arrow "A" in FIG. 2. With this, the upper end portion 44b of the button 44 is brought into contact with the lower end of the stopper 36 and pushes the same upward against the force of the spring 42. The upward movement of the stopper 36 disengages the first projection 36a thereof from the cut 34 of the gear case 18 against the force of the leaf spring 38, due to the function of the slidably mated inclined surfaces 36c and 34a of them. Then, with the push button 44 being pushed, the same is turned for about 180 degrees in the direction of the arrow "B" in FIG. 1. With this, the eccentric bushing 20 and the stopper 36 are rotated together and brought to an angular new position where the second projetion 36b of the stopper 36 is engaged with the cut 43 of the output gear 16. With this, the bushing 20 and the output shaft 16 are locked to each other through the stopper 36. Thus, under this condition, rotation of the output gear 16 is transmitted not only to the output shaft 24 but also to the bushing 20. That is, under this condition, the rotation of the output gear 16 induces that the output shaft 24 rotates about its axis "W" while turning about the axis "V" of the bushing 20. This condition will be understood from FIGS. 4(B) and 4(C). That is, as is seen from FIG. 4(B), due to the above-mentioned unique rotation of the output shaft 24, the functional length of the motor arm 52 is increased by "l" which is gained by the turning of the output shaft 24 about the axis "V" of the bushing 20. This means that, as is seen from FIG. 4(C), the leading end of the motor arm 52 describes a circular path "E" which is larger than the path "C" of FIG. 4(A), and thus the stroke of the reciprocatively movable connecting rod 54 is greater than that in case of the afore-mentioned "semi-concealed mode" of FIG. 4(A). Thus, under this condition, the wiper blades 58 and 58 describe the sweeping patterns "F" on the windshield 60. In this case, the "full-concealed mode" is carried out.

As will be understood from the foregoing description, in the present invention, the mode change of the wiper from "semi-concealed mode" to "full-concealed mode" or vice versa is easily carried out. That is, only by pushing and turning the push button 44, the mode change is instantly and easily effected.

What is claimed is:

1. A wiper comprising:
   a case;
   an output gear housed in said case and rotatable about its axis;
   an output shaft extending perpendicular to said output gear and having one end to which a motor arm is secured;
   a wiper arm assembly including a connecting rod which has one end pivotally connected to a free end of said motor arm;
   first means for transmitting rotation of said output gear to said output shaft;
   a bushing having an eccentric bore through which said output shaft is rotatably received, said bushing being rotatably received in said case;
   second means for locking said bushing to one of said case and said output gear while changing relative angular positioning between said bushing and said output gear; and a push button arranged on said case and actuating said second means when manipulated.

2. A wiper as claimed in claim 1, in which said first means comprises:
- a radially extending recess formed in said output gear;
- a pin having one end projected into said recess of said output gear; and
- an arm having one end secured to said output shaft and the other end secured to said pin.

3. A wiper as claimed in claim 2, in which said second means comprises:
- means defining in said bushing an axially extending groove;
- a stopper having first and second projections, said stopper being movably received in said groove of said bushing;
- means defining in said case a first cut into which said first projection of said stopper is projected to latch said bushing to said case when said bushing assumes a first given position relative to said case;
- means defining in said output gear a second cut into which said second projection of said stopper is projected to latch said bushing to said output gear when said bushing assumes a second given position relative to said case; and
- biasing means for biasing said stopper in a given direction.

4. A wiper as claimed in claim 3, in which said output gear is formed with a center bore in said bushing is rotatably received.

5. A wiper as claimed in claim 4, in which said output shaft has the other end to which the arm of said first means is secured.

6. A wiper as claimed in claim 5, in which said push button has an end portion projected into the axially extending groove of said bushing, said end portion pushing said stopper to disengage said first projection of the stopper from said first cut of the case when said push button is pushed into said case.

7. A wiper as claimed in claim 6, in which said push button is biased in a direction away from said case by a spring.

8. A wiper as claimed in claim 7, in which said spring is compressed between said push button and a base portion of said arm of the first means.

9. A wiper as claimed in claim 8, in which the end portion of said push button is engageable with a side wall of said axially extending groove of the bushing when the push button is pushed into said case, so that when, with the push button being pushed, the same is turned about its axis, said bushing is forced to turn about its axis.

10. A wiper as claimed in claim 9, in which said biasing means of said second means comprises:
- a spring received in an extension of the axially extending groove of the bushing to bias the stopper toward said push button; and
- a curved leaf spring disposed between said stopper and a bottom of said axially extending groove to bias said stopper in a radially outward direction.

11. A wiper as claimed in claim 10, in which said first projection of said stopper and said first cut of said case are respectively formed with mutually engageable inclined surfaces in order to facilitate getting in and getting out motions of said first projection relative to said first cut.

12. A wiper as claimed in claim 11, in which said push button is formed with a flange which is engageable with a part of said case to prevent the push button from getting off the case.

* * * * *